US011930560B2

(12) United States Patent
Takada et al.

(10) Patent No.: US 11,930,560 B2
(45) Date of Patent: Mar. 12, 2024

(54) USER APPARATUS AND BASE STATION APPARATUS

(71) Applicant: NTT DOCOMO, INC., Tokyo (JP)

(72) Inventors: Takuma Takada, Tokyo (JP); Yuta Oguma, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 414 days.

(21) Appl. No.: 17/431,067

(22) PCT Filed: Feb. 21, 2019

(86) PCT No.: PCT/JP2019/006669
§ 371 (c)(1),
(2) Date: Aug. 13, 2021

(87) PCT Pub. No.: WO2020/170405
PCT Pub. Date: Aug. 27, 2020

(65) Prior Publication Data
US 2022/0078603 A1    Mar. 10, 2022

(51) Int. Cl.
*H04W 8/22* (2009.01)
*H04W 56/00* (2009.01)
(Continued)

(52) U.S. Cl.
CPC ........... *H04W 8/22* (2013.01); *H04W 56/004* (2013.01); *H04W 72/0453* (2013.01); *H04W 76/15* (2018.02)

(58) Field of Classification Search
CPC . H04W 8/22; H04W 56/004; H04W 72/0453; H04W 76/15; H04W 88/06;
(Continued)

(56) References Cited

U.S. PATENT DOCUMENTS 9,622,281 B2 * 4/2017 Axmon .................. H04W 24/08
10,397,972 B2 * 8/2019 Jung ...................... H04W 76/15
(Continued)

FOREIGN PATENT DOCUMENTS

WO    2017026334 A1    2/2017

OTHER PUBLICATIONS

Samsung; "Clarification on Sync/Async EN-DC scenarios and Correction to Timing Requirement"; 3GPP TSG-RAN WG4 Meeting #86Bis, R4-1803849; Melbourne, Australia; Apr. 16-20, 2018 (5 pages).

(Continued)

*Primary Examiner* — Ahmed Elallam
(74) *Attorney, Agent, or Firm* — Osha Bergman Watanabe & Burton LLP

(57)  ABSTRACT

A user apparatus includes a reception unit that receives, from a base station, information requesting a capability report of the user apparatus; a transmission unit that transmits, to the base station, the capability report of the user apparatus; and a control unit that receives a first signal transmitted from the base station, and a second signal transmitted from another base station or a third signal transmitted from the base station, within a maximum receive timing difference associated with a band combination included in the capability report of the user apparatus, wherein the band combination includes a combination of a band of the first signal and a band of the second signal or the third signal, a radio access technology for the first signal differs from that of the second signal, and the radio access technologies for the first signal and for the third signal are the same.

5 Claims, 5 Drawing Sheets

(51) Int. Cl.
*H04W 72/04* (2023.01)
*H04W 72/0453* (2023.01)
*H04W 76/15* (2018.01)

(58) Field of Classification Search
CPC .. H04W 56/001; H04W 56/0065; H04W 8/24
See application file for complete search history.

(56) References Cited

U.S. PATENT DOCUMENTS

| | | | | |
|---|---|---|---|---|
| 10,917,205 | B2* | 2/2021 | Kim | H04W 72/21 |
| 11,381,358 | B2* | 7/2022 | Yang | H04W 72/02 |
| 11,558,842 | B2* | 1/2023 | Kim | H04W 56/001 |
| 11,800,475 | B2* | 10/2023 | Rahman | H04W 56/004 |
| 2016/0353442 | A1* | 12/2016 | Uchino | H04W 24/10 |
| 2018/0019898 | A1 | 1/2018 | Takahashi et al. | |
| 2021/0058996 | A1* | 2/2021 | Yang | H04W 56/001 |

OTHER PUBLICATIONS

Office Action issued in Chinese Application No. 201980092431.6, dated May 24, 2023 (20 pages).
3rd Generation Partnership Project; Technical Specification Group Radio Access Network; NR; "Requirements for support of radio resource management (Release 15)"; 3GPP TS 38.133 V15.4.0; Jan. 17, 2019 (3 pages).
3rd Generation Partnership Project; Technical Specification Group Radio Access Network; NR; "Radio Resource Control (RRC) protocol specification (Release 15)"; 3GPP TS 38.331 V15.4.0; Jan. 14, 2019 (7 pages).
3rd Generation Partnership Project; Technical Specification Group Radio Access Network; NR; "NR and NG-RAN Overall Description; Stage 2 (Release 15)"; 3GPP TS 38.300 V15.4.0; Dec. 2018 (97 pages).
Brd Generation Partnership Project; Technical Specification Group Radio Access Network; NR; "Evolved Universal Terrestrial Radio Access (E-UTRA) and NR; Multi-connectivity; Stage 2 (Release 15)"; 3GPP TS 37.340 V15.4.0; Dec. 2018 (67 pages).
CATT; "Further discussion on MRTD requirement for NR CA"; 3GPP TSG-RAN WG4#86bis; R4-1803708; Apr. 6, 2018 (2 pages).
Intel Corporation; "On MRTD requirement for non-contiguous CA"; 3GPP TSG-RAN WG4#90; R4-1900372; Feb. 15, 2019 (3 pages).
International Search Report issued in corresponding International Application No. PCT/ JP2019/006669, dated May 7, 2019, with translation (5 pages).
Written Opinion issued in corresponding International Application No. PCT/JP2019/006669, dated May 7, 2019 (4 pages).

* cited by examiner

USER APPARATUS AND BASE STATION APPARATUS

TECHNICAL FIELD

The present invention relates to a user apparatus and a base station apparatus in a radio communication system.

BACKGROUND ART

For New Radio (NR) (which is also referred to as "5G") that is a successor system to Long Term Evolution (LTE), technology has been studied that meets requirements, such as those of large capacity system, a high data transmission rate, low latency, simultaneous connection of multiple terminals, low cost, and power saving (e.g., Non-Patent Document 1).

In an NR system, similar to dual connectivity in an LTE system, a technique called LTE-NR dual connectivity, NR-NR dual connectivity, or Multi Radio Access Technology (Multi-RAT) dual connectivity (which is referred to as "MR-DC," hereinafter) has been introduced such that data is divided between a base station of an LTE system (eNB) and a base station of an NR system (gNB) and data is simultaneously transmitted and received by these base stations (e.g., Non-Patent Document 2). Furthermore, for signals transmitted from a master node and a secondary node, a Maximum receive timing difference (MRTD) that can be processed by a user apparatus has been specified (e.g., Non-Patent Document 3).

RELATED ART DOCUMENT

Non-Patent Document

Non-Patent Document 1: 3GPP TS 38.300 V15.4.0(2018-12)
Non-Patent Document 2: 3GPP TS 37.340 V15.4.0(2018-12)
Non-Patent Document 3: 3GPP TS 38.133 V15.4.0(2018-12)

SUMMARY OF THE INVENTION

Problem to be Solved by the Invention

For some EN-DC band combinations, frequency bands of the corresponding bands are close to each other. For such an EN-DC band combination, since only one receiver is implemented due to RF circuit restrictions, the receiver is to simultaneously receive the cells. However, for EN-DC, there has been a case in which a value for inter-band is referenced as the MRTD.

The present invention has been accomplished in view of the above-described point, and an object is to correctly set a received timing difference for dual connectivity or carrier aggregation that is executed in a radio communication system using multiple radio access technologies (RATs).

Means for Solving the Problem

According to the disclosed technology, there is provided a user apparatus including a reception unit that receives, from a base station apparatus, information requesting a capability report of the user apparatus; a transmission unit that transmits, to the base station apparatus, the capability report of the user apparatus; and a control unit that receives a first signal transmitted from the base station apparatus, and a second signal transmitted from another base station apparatus or a third signal transmitted from the base station apparatus, within a maximum receive timing difference associated with a band combination included in the capability report of the user apparatus, wherein the band combination includes a combination of a band of the first signal and a band of the second signal or a band of the third signal, and wherein a radio access technology for the first signal differs from a radio access technology for the second signal, and the radio access technology for the first signal is same as a radio access technology for the third signal.

Advantage of the Invention

According to the disclosed technology, a received timing difference for dual connectivity that is executed in a radio communication system using multiple radio access technologies (RATs) can be correctly set.

EMBODIMENTS OF THE INVENTION

In the following, embodiments of the present invention are described with reference to the drawings. The embodiments described below are merely examples, and embodiments to which the present invention is applied are not limited to the embodiments described below.

In operating a radio communication system according to an embodiment of the present invention, existing technology is used as appropriate. Here, the existing technology is, for example, the existing LTE. However, the existing technology is not limited to the existing LTE. The term "LTE" as used in this specification has a broad meaning including LTE-Advanced and a scheme subsequent to LTE-Advanced (e.g., NR), unless as otherwise specified.

In the embodiments of the present invention described below, terms used in the existing LTE are used, such as SS (Synchronization signal), PSS (Primary SS), SSS (Secondary SS), PBCH (Physical broadcast channel), and PRACH (Physical random access channel). This is for convenience of description, and signals, functions, and the like similar to these may be referred to by other names. The above-described terms in NR correspond to NR-SS, NR-PSS, NR-SSS, NR-PBCH, NR-PRACH, and so forth. However, even if a signal is used for NR, the signal is not always specified as "NR-."

In the embodiments of the present invention, a duplex method may be a Time Division Duplex (TDD) method, a Frequency Division Duplex (FDD) method, or any other method (e.g., Flexible Duplex).

In the embodiments of the present invention, "configuring" a radio parameter, or the like, may be "pre-configuring" a predetermined value, or configuring a radio parameter transmitted from a base station apparatus 10 or a user apparatus 20.

Figure 1:
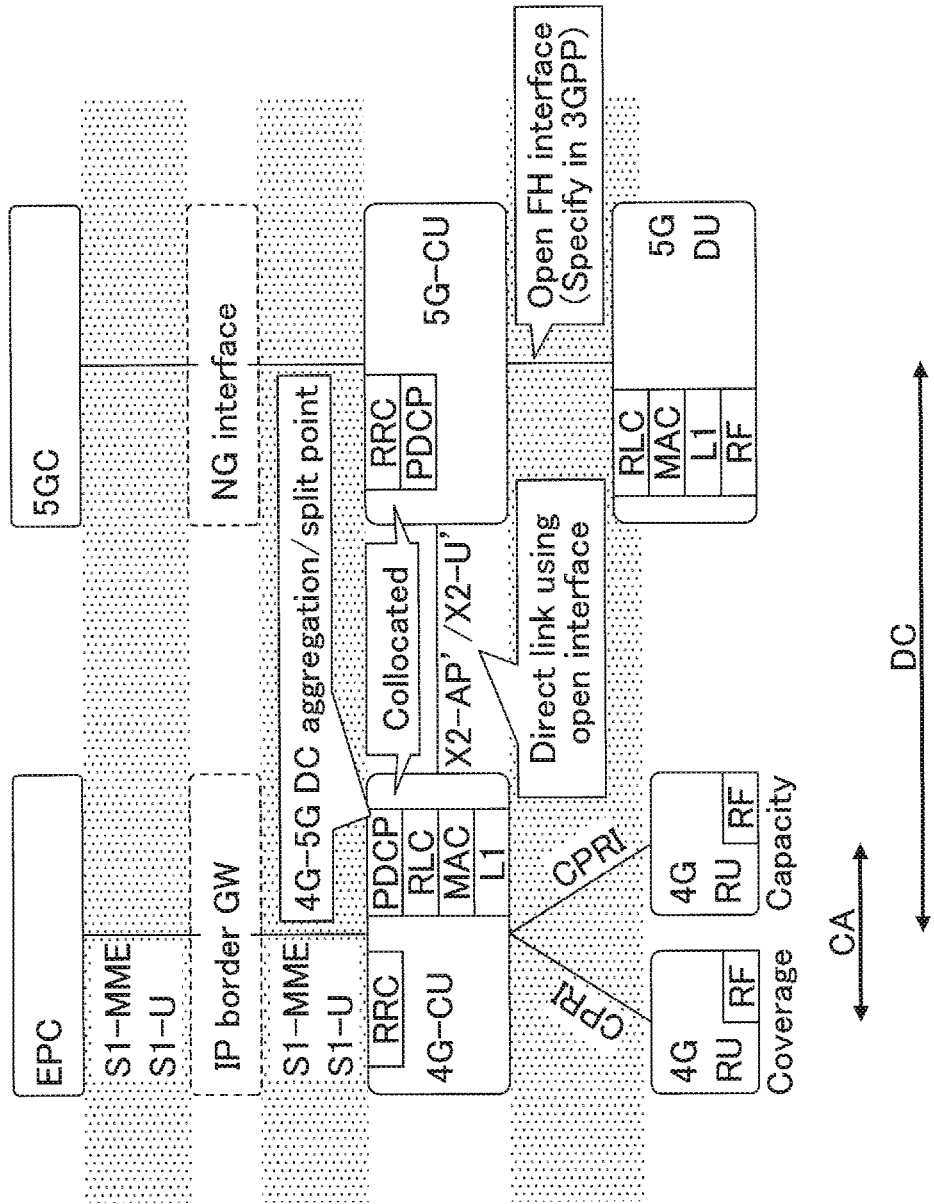
FIG. 1 is a diagram illustrating an example of a configuration of a network architecture according to an embodiment of the present invention.

FIG. 1 is a diagram illustrating an example of a configuration of a network architecture in the embodiments of the present invention. As illustrated in FIG. 1, a radio network architecture according to an embodiment of the present invention includes 4G-CU, 4G-RU (Remote Unit, remote radio station), an Evolved Packet Core (EPC), and the like, on an LTE-Advanced side. The radio network architecture according to the embodiment of the present invention includes 5G-CU, 5G-DU, and the like, on a 5G side.

As illustrated in FIG. 1, 4G-CU includes layers up to the Radio Resource Control (RRC), Packet Data Convergence Protocol (PDCP), Radio Link Control (RLC), Medium Access Control (MAC), and L1 (Layer 1, PHY layer or physical layer) and is connected to 4G-RU via Common Public Radio Interface (CPRI). A network node including 4G-CU and 4G-RU is referred to as eNB.

On the 5G side, as illustrated in FIG. 1, 5G-CU includes an RRC layer; is connected to 5G-DU via a Fronthaul (FH) interface; and is connected to 5G Core Network (5GC) via an NG interface. 5G-CU is also connected to 4G-CU via an X2 interface. The PDCP layer in 4G-CU is a coupling point or a separation point for performing 4G-5G Dual Connectivity (DC), i.e., E-UTRA-NR Dual Connectivity (EN-DC). A network node including 5G-CU and 5G-DU is referred to as gNB. 5G-CU may also be referred to as gNB-CU, and the 5G-DU may be referred to as gNB-DU.

As illustrated in FIG. 1, a Carrier Aggregation (CA) is performed between 4G and RU, and DC is performed between 4G-RU and 5G-DU. Note that, though it is not depicted, a User Equipment (UE) is wirelessly connected via 4G-RU RF or 5G-DU RF to transmit and receive packets.

Note that FIG. 1 illustrates a radio network architecture for LTE-NR DC, i.e., EN-DC (E-UTRA-NR Dual Connectivity (EN-DC). However, a similar radio network architecture may be used when 4G-CU is separated into CU-DU or when NR standalone operation is performed. When the 4G-CU is separated into CU-DU, functions related to the RRC layer and the PDCP layer may be moved to 4G-CU and the RLC layer or lower may be included in 4G-DU. Here, a CPRI data rate may be reduced by CU-DU separation.

A plurality of 5G-DUs may be connected to 5G-CU. Furthermore, NR-NR Dual Connectivity (NR-DC) may be performed by connecting a UE to a plurality of 5G-CUs, or NR-DC may be performed by connecting a UE to a plurality of 5G-DUs and a single 5G-CU.

Figure 2:
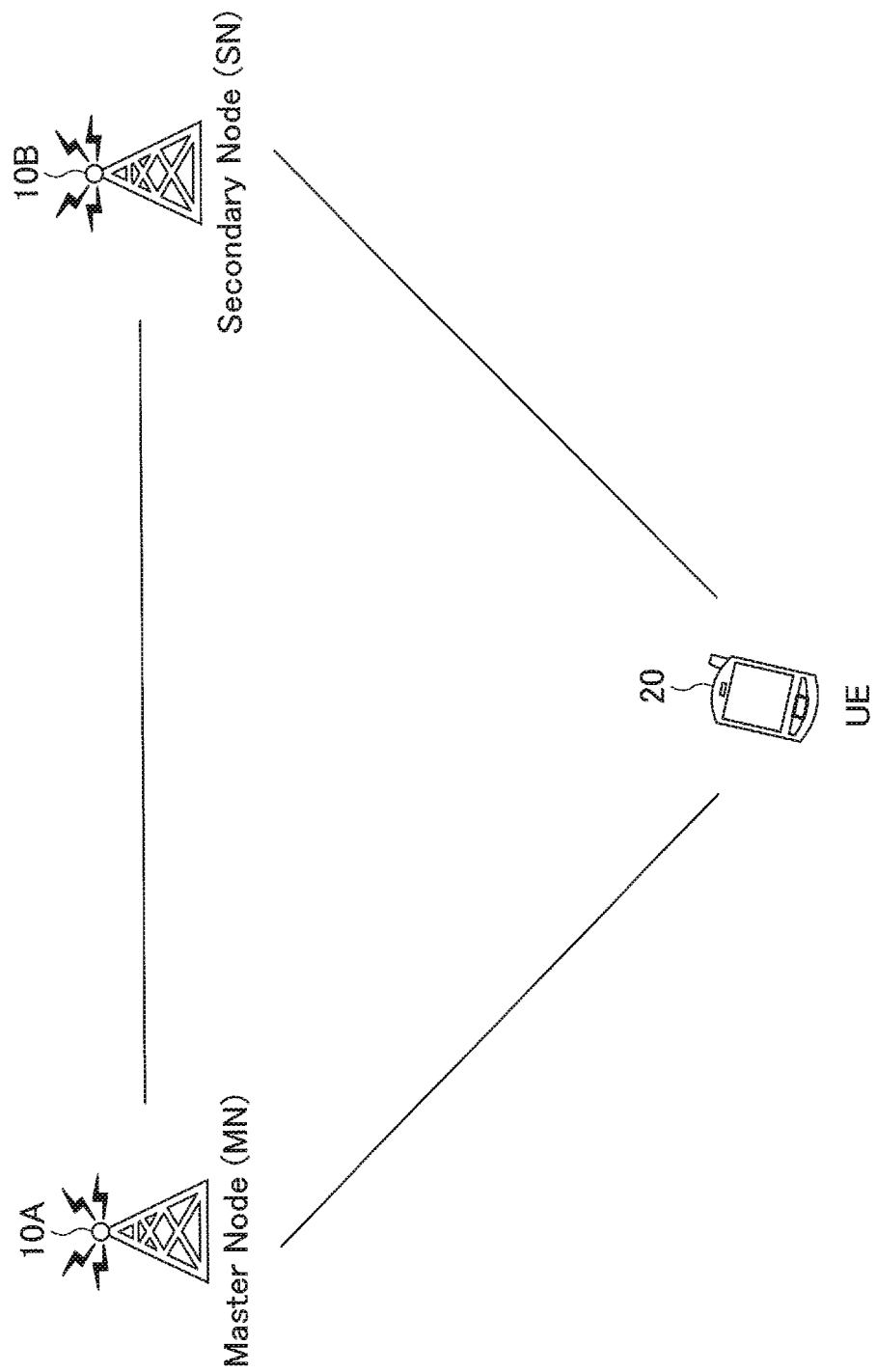
FIG. 2 is a diagram illustrating an example of a configuration of a radio communication system according to an embodiment of the present invention.

FIG. 2 is a diagram illustrating an example of a configuration of a radio communication system according to an embodiment of the present invention. FIG. 2 is a schematic diagram illustrating a radio communication system for Multi-RAT Dual Connectivity (MR-DC).

As illustrated in FIG. 2, a user apparatus 20 communicates with a base station apparatus 10A provided by an NR system and a base station apparatus 10B provided by the NR system (hereinafter, referred to as "base station apparatuses 10" for a case where the base station apparatus 10A and the base station apparatus 10B are not distinguished). In addition, the user apparatus 20 supports NR-NR dual connectivity, that is, NR-DC, where the base station apparatus 10A is used as a master node (hereinafter referred to as "MN") and the base station apparatus 10B is used as a secondary node (hereinafter referred to as "SN"). The user apparatus 20 may implement simultaneous transmission to or simultaneous reception from the base station apparatus 10A which is the master node and the base station apparatus 10B which is the secondary node, by simultaneously using a plurality of component carriers provided by the base station apparatus 10A which is the master node and the base station apparatus 10B which is the secondary node.

As illustrated in FIG. 2, the user apparatus 20 may communicate with the base station apparatus 10A provided by an LTE system and the base station apparatus 10B provided according to an NR system. In addition, the user apparatus 20 may support LTE-NR dual connectivity, that is, EN-DC, where the base station apparatus 10A is used as an MN and the base station apparatus 10B is used as an SN. The user apparatus 20 may implement simultaneous transmission to or simultaneous reception from the base station apparatus 10A which is the master node and the base station apparatus 10B which is the secondary node, by simultaneously using a plurality of component carriers provided by the base station apparatus 10A which is the master node and the base station apparatus 10B which is the secondary node.

As illustrated in FIG. 2, the user apparatus 20 may communicate with the base station apparatus 10A provided by an NR system and the base station apparatus 10B provided by an LTE system. In addition, the user apparatus 20 may support NR-LTE dual connectivity, that is, NR-E-UTRA Dual Connectivity (NE-DC), where the base station apparatus 10A is used as an MN and the base station apparatus 10B is used as an SN. The user apparatus 20 may implement simultaneous transmission to or simultaneous reception from the base station apparatus 10A which is the master node and the base station apparatus 10B which is the secondary node, by simultaneously using a plurality of component carriers provided by the base station apparatus 10A which is the master node and the base station apparatus 10B which is the secondary node.

Although the following embodiment is described assuming LTE-NR dual connectivity, i.e., EN-DC, the user apparatus 20 according to the embodiment of the present invention is not limited to the dual connectivity described above, and is applicable to dual connectivity among a plurality of radio communication systems using different RATs, that is, MR-DC.

Here, a maximum receive timing difference (MRTD) that can be processed by the user apparatus 20 when the user apparatus 20 receives each component carrier (CC) at the time of EN-DC is specified. In a specified value of the MRTD, a propagation delay and a delay caused by a difference at the time of transmission on the base station apparatus 10 side are considered.

Table 1 illustrates a specific example of an MRTD for an inter-band synchronous EN-DC.

TABLE 1

| Sub-carrier spacing in E-UTRA PCell (kHz) | DL Sub-carrier spacing in PSCell (kHz) (Note 1) | Maximum receive timing difference (μs) |
|---|---|---|
| 15 | 15 | 33 |
| 15 | 30 | |

TABLE 1-continued

| Sub-carrier spacing in E-UTRA PCell (kHz) | DL Sub-carrier spacing in PSCell (kHz) (Note 1) | Maximum receive timing difference (µs) |
|---|---|---|
| 15 | 60 | |
| 15 | 120 | |

NOTE 1: DL Sub-carrier spacing in min { $SCS_{SS}$, $SCS_{DATA}$ } .
NOTE 2: Void As shown in Table 1, a sub-carrier spacing in E-UTRA is 15 kHz. When the DL sub-carrier spacing in a PSCell of NR is 15 kHz, 30 kHz, 60 kHz, or 120 kHz, the MRTD is specified to be 33 µs. The MRTD 33 µs in this case is calculated by the sum of 30 µs which is a difference caused by the propagation delay and 3 µs which is a delay caused by a difference at the time of transmission on the base station apparatus 10 side. The DL sub-carrier spacing in the PSCell corresponds to the smallest sub-carrier spacing out of an SS sub-carrier spacing and a data sub-carrier spacing.

Table 2 illustrates a specific example of an MRTD for an intra-band synchronous EN-DC.

TABLE 2

| Sub-carrier spacing in E-UTRA PCell (kHz) | DL Sub-carrier spacing in PSCell (kHz) $^{Note\ 1}$ | Maximum receive timing difference (µs) |
|---|---|---|
| 15 | 15 | 3 |
| 15 | 30 | 3 |
| 15 | 60 | 3 |

$^{NOTE\ 1}$ DL Sub-carrier spacing in min { $SCS_{SS}$, $SCS_{DATA}$ } .

As shown in Table 2, a sub-carrier spacing in E-UTRA is 15 kHz. When the DL sub-carrier spacing in a PSCell of NR is 15 kHz, 30 kHz, or 60 kHz, the MRTD is specified to be 3 µs. The MRTD of 3 µs in this case is calculated by the sum of 0 µs which is a difference caused by the propagation delay and 3 µs which is a delay caused by a difference at the time of transmission on the base station apparatus 10 side. In the case of the intra-band, there is no propagation delay because it is assumed that signals are transmitted from the same location.

Table 3 illustrates a specific example of an MRTD for an intra-band non-contiguous CA.

TABLE 3

| Frequency Range | Maximum receive timing difference (µs) |
|---|---|
| FR1 | 3 |
| FR2 | 3 |

As shown in Table 3, in a case in which the frequency range is a frequency range 1 (FR1) or a frequency range 2 (FR2), 3 µs is specified as the MRTD. The MRTD of 3 µs in this case is calculated by the sum of 0 µs which is a difference caused by the propagation delay and 3 µs which is a delay caused by a difference at the time of transmission on the base station apparatus 10 side. In the case of the intra-band, similar to Table 2, there is no propagation delay because it is assumed that signals are transmitted from the same location.

Table 4 illustrates a specific example of an MRTD for an inter-band CA.

TABLE 4

| Frequency Range | Maximum receive timing difference (µs) |
|---|---|
| FR1 | 33 |
| FR2 | 8 |
| Between FR1 and FR2 | 25 |

As shown in Table 4, in a case in which the frequency range is FR1, 33 µs is specified as the MRTD. The MRTD 33 µs in this case is calculated by the sum of 30 µs which is a difference caused by the propagation delay and 3 µs which is a delay caused by a difference at the time of transmission on the base station apparatus 10 side. In a case in which the frequency range is FR2, 8 µs is specified as the MRTD. The MRTD 8 µs in this case is calculated by the sum of 5 µs which is a difference caused by the propagation delay and 3 µs which is a delay caused by a difference at the time of transmission on the base station apparatus 10 side. If the frequency range is between FR1 and FR2, 22 µs is specified as the MRTD. The MRTD 25 µs in this case is calculated by the sum of 22 µs which is a difference caused by the propagation delay and 3 µs which is a delay caused by a difference at the time of transmission on the base station apparatus 10 side.

As in the case of the inter-band CA above, in a case in which the propagation delay is considered within the specified value, EN-DC or CA can be executed while locating the base station apparatuses 10 that transmit the respective CCs at different locations. For example, in a case in which the propagation delay of 30 µs is considered, it is possible to place the respective base station apparatuses 10 apart from each other by up to about 9 km (=30 µs×3.0×10$^8$ m/s). Since it is determined whether or the same location is mandatory depending on the MRTD, the MRTD is an important rule when the operator decides a deployment policy.

However, in some EN-DCs or CAs specified in a technical specification document, even if they are defined as inter-band, only one receiver is prepared due to RF circuit restrictions, and there are cases where it is necessary to perform simultaneous reception of CCs. For example, EN-DC with a band combination of LTE B42-NR n77 is defined as the inter-band EN-DC, but simultaneous reception is expected as an RF rule because the frequency bands are close. In other words, since it is the inter-band EN-DC, it is necessary to transmit respective CCs from the same location, even if the propagation delay is considered. Accordingly, in the EN-DC of LTE B42-NR n77 defined as the inter-band EN-DC, based on the technical specification document, though it suffices if the MRTD of 3 µs is supported, the user apparatus 20 is to support the MRTD of 33 µs, so that the resource consumption increases.

As described above, in the rule of the MRTD in the technical specification document, for a band combination, it is only considered whether the band combination is inter-band or intra-band, without considering whether the band combination is an EN-DC band combination or a CA band combination. However, in the RF rule, the rule is developed on the basis of the feasibility of an RF circuit regardless of the MRTD, the inter-band, the intra-band, or the like. Accordingly, there is a gap in rules between the technical specification documents.

A determination of an appropriate deployment policy can be facilitated for an operator by clearly defining an EN-DC band combination or a CA band combination, an MRTD, a propagation delay, and a base station location in a technical specification document.

As a first example, an EN-DC band combination or a CA band combination that is an exception is added, without modifying the definition of the MRTD in the technical specification document and the EN-DC band combination or the CA band combination in the technical specification document. Table 5 illustrates a specific example of an MRTD for an inter-band synchronous EN-DC.

TABLE 5

| Sub-carrier spacing in E-UTRA PCell (kHz) | DL Sub-carrier spacing in PSCell (kHz) (Note 1) | Maximum receive timing difference (μs) |
|---|---|---|
| 15 | 15 | 33 |
| 15 | 30 | |
| 15 | 60 | |
| 15 | 120 | |

NOTE 1: DL Sub-carrier spacing in min { $SCS_{SS}$, $SCS_{DATA}$ }.
NOTE 2: Void
NOTE 3: DC_42A_n77A and DC_42A_n77C apply MRTD requirement for intra-band synchronous EN-DC As shown in Table 5, a sub-carrier spacing in E-UTRA is 15 kHz. When the DL sub-carrier spacing in a PSCell of NR is 15 kHz, 30 kHz, 60 kHz, or 120 kHz, the MRTD is specified to be 33 μs. Further, it may be specified in in "NOTE 3" that MRTD requirement for the intra-band synchronous EN-DC are applied for DC_42A_n77A and DC_42A_n77C. In other words, for DC_42A_n77A and DC_42A_n77C, 3 μs is applied as the MRTD. Similarly, for the band combination of the CA that is an exception, "NOTE 3" described above may be specified.

Table 6 illustrates a specific example of a configuration of the EN-DC or the CA in the case of inter-band synchronous EN-DC.

TABLE 6

| EN-DC configuration | Uplink EN-DC configuration (NOTE 1) | E_UTRA configuration | NR configuration |
|---|---|---|---|
| DC_42A_n77A[NOTE 3] | N/A | 42A | n 77A |
| DC_42A_n77C[NOTE 3] | | | CA_n77C |
| ... | ... | ... | ... |

NOTE 1: Uplink CA configurations are the configurations supported by the present release of specifications.
NOTE 2: Restricted to E-UTRA operation when inter-band carrier aggregation is configured. The downlink operating band for Band 46 is paired with the uplink operating band (external E-UTRA band) of the carrier aggregation configuration that is supporting the configured Pcell.
NOTE 3: DC_42A_n77A and DC_42A_n77C apply MRTD requirement for intra-band synchronous EN-DC As shown in Table 6, in DC_42A_n77A, 42A is used in E-UTRA, and n77A is used in NR, and in DC_42A_n77C, 42A is used in E-UTRA, and CA_n77C is used in NR. Furthermore, it may be specified in "NOTE 3" that MRTD requirement for the intra-band synchronous EN-DC are applied in the case of DC_42A_n77A and DC_42A_n77C. In other words, in the case of DC_42A_n77A and DC_42A_n77C, 3 μs is applied as the MRTD.

As described above, for example, for inter-band EN-DC in which simultaneous reception is to be performed, such as EN-DC using LTE B42-NR n77, that is, a case in which a propagation delay is not considered and, thus, deployment at the same location is required, the rule of the intra-band EN-DC is applied to the band combination as an exception. Similarly, if deployment at the same location is necessary for a CA band combination, the rule of the intra-band CA is applied to the band combination as an exception.

As a second example, the definitions of the inter-band and the intra-band are modified, so that the MRTD is used as a base. In the current definition of the intra-band, a band combination within the same band is defined to be the intra-band. For example, NR n77-NR n77 CA and LTE B41-NR n41 EN-DC (n41 is a band obtained by converting B41 into NR) are intra-bands.

In addition to the above definition of the intra-band, the band combination of the inter-band EN-DC or CA which need to be received at the same timing (for example, within 3 μs) on the RF circuit is defined as the intra-band. For example, DC_42A_n77A or DC_42A_n77C is defined to be the intra-band.

As described above, for example, if simultaneous reception is to be performed for the inter-band EN-DC, i.e., in a case in which a propagation delay is not considered and deployment at the same location is necessary, the definition of the EN-DC on LTE B42-NR n77 may be modified to be the intra-band EN-DC, instead of the inter-band. Similarly, if simultaneous reception is to be performed for a CA band combination, the band combination may be defined to be that of the intra-band CA.

As a third example, information related to the MRTD or base station locations may be added for each band combination of the EN-DC or the CA specified in a technical specification document. Table 7 is a specific example of adding information related to the MRTD or the base station locations for each band combination of the EN-DC or the CA.

TABLE 7

| EN-DC configuration | Uplink EN-DC configuration (NOTE 1) | E-UTRA configuration | NR configuration | MRTD or base station locations |
|---|---|---|---|---|
| DC_1A_n28A | DC_1A_n28A | 1A | n28A | 33 μs/non co-locate |
| DC_1A_n40A | DC_1A n40A | 1A | n40A | 33 μs/non co-locate |
| DC_1A_n51A | DC_1A_n51A | 1A | n51A | 33 μs/non co-locate |
| ... | ... | ... | ... | ... |
| DC_41A_n77A | DC_41A_n77A | 41A | n77A | 33 μs/non co-locate |
| DC_41A_n78A | DC_41A_n78A | 41A | n78A | 33 μs/non co-locate |
| DC_41A_n79A | DC_41A_n79A | 41A | n79A | 33 μs/non co-locate |
| DC_41C_n77A | DC_41C_n77A | CA_41C | n77A | 33 μs/non co-locate |
| DC_41C_n78A | DC_41C_n78A | CA_41C | n78A | 33 μs/non co-locate |
| DC_41C_n79A | DC_41C_n79A | CA_41C | n79A | 33 μs/non co-locate |
| DC_42A_n51A | DC_42A_n51A | 42A | n51A | 33 μs/non co-locate |
| DC_42A_n77A DC_42A_n77C | N/A | 42A | n77A CA_n77C | 3 μs/co-locate |
| DC_42D_n79A | N/A | CA_42D | n79A | 3 μs/co-locate |
| ... | ... | ... | ... | ... |

NOTE 1: Uplink CA configurations are the configurations supported by the present release of specifications.
NOTE 2: Restricted to E-UTRA operation when inter-band carrier aggregation is configured. The downlink operating band for Band 46 is paired with the uplink operating band (external E-UTRA band) of the carrier aggregation configuration that is supporting the configured Pcell.

As shown in Table 7, information indicating the MRTD or the base station locations is added on a per EN-DC band combination (EN-DC configuration) basis. For example, for DC_1A_n28A that is an EN-DC band combination, the information indicating that the MRTD of 33 µs or information indicating "non co-locate" implying that the base station locations are assumed not to be the same is added. Furthermore, for example, for DC_42A_n77A that is an EN-DC band combination, the information indicating that the MRTD of 3 µs or information indicating "co-locate" implying that the base station locations are assumed to be the same is added. One of the information indicating the MRTD and the information indicating the base station locations may be added to an EN-DC band combination. That is, when the information indicating the base station locations is associated with the band combination, for example, if the information indicating the base station locations is "non co-locate," 33 µs may be determined as the MRTD, and if the information indicating the base station locations is "co-locate," 3 µs may be determined as the MRTD. The value of the MRTD to be determined is an example, and other values may be used.

The information indicating the MRTD or the base station locations of each band combination of the EN-DC shown in Table 7 may be specified in a new table or a new chapter related to the propagation delay or the base station location, instead of adding to the existing table in the technical specification document. Note that, the EN-DC band combination shown in Table 7 may be replaced with a CA band combination.

Figure 3:
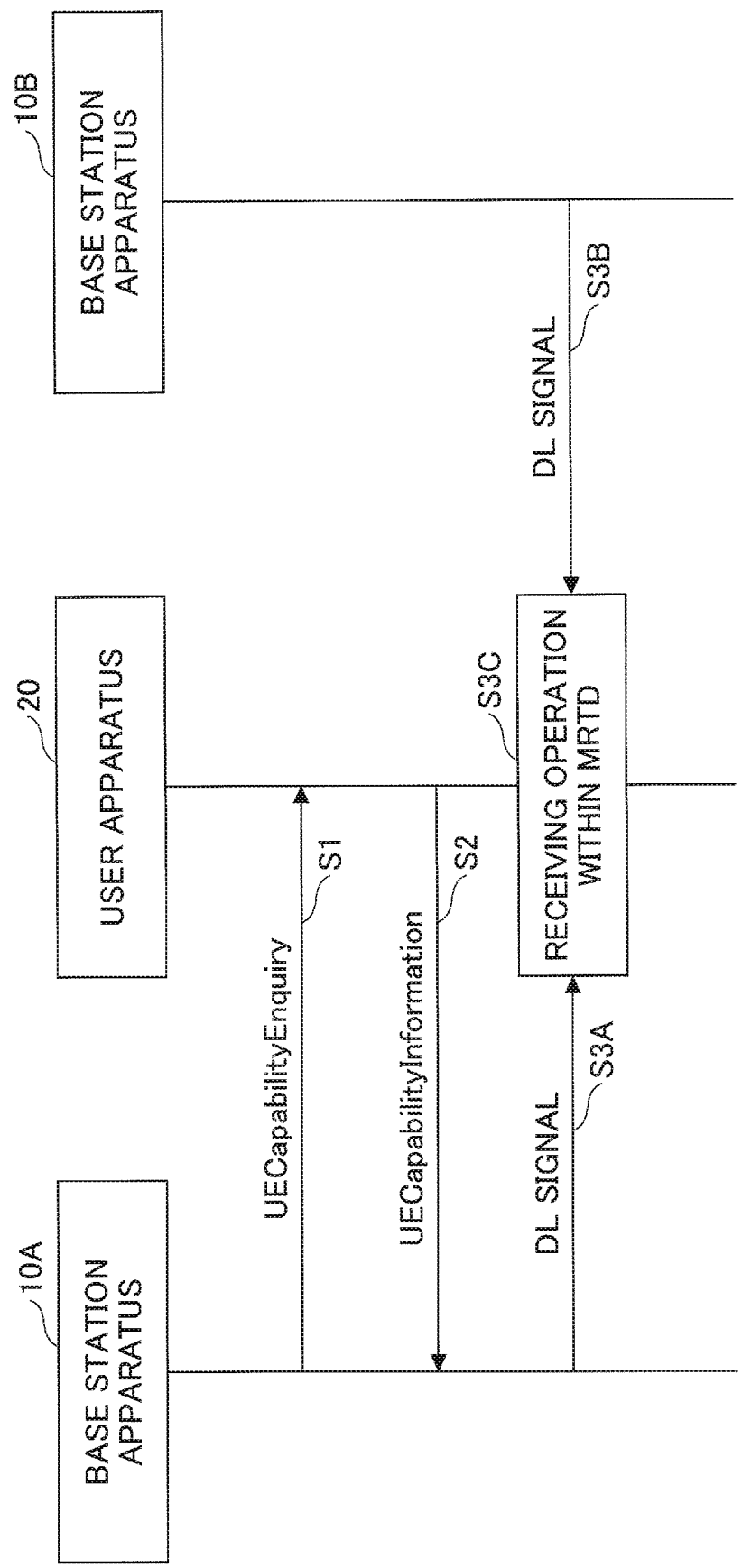
FIG. 3 is a sequence diagram for illustrating an operation example according to an embodiment of the present invention.

FIG. 3 is a sequence diagram for describing an operation example in an embodiment of the present invention. An operation example to which the above-described specification on the MRTD is applied is described with reference to FIG. 3.

In step S1, the base station apparatus 10A that is the master node transmits "UECapabilityEnquiry" that is an RRC message to the user apparatus 20. The "UECapabilityEnquiry" is used for the base station apparatus 10A to receive the UE capability of the user apparatus 20. Subsequently, the user apparatus 20 transmits "UECapabilityInformation" to the base station apparatus 10A (S2). The "UECapabilityInformation" is used to transmit the UE capability of the user apparatus 20 to the base station apparatus 10A. The "UECapabilityInformation" includes, as the UE capability, the EN-DC band combination supported by the user apparatus 20 from among the above-described EN-DC band combinations.

In step S3A, the base station apparatus 10A transmits a DL signal to the user apparatus 20 on a band on the LTE side of the configured band combination from among the UE capabilities of the user apparatus 20, that is, the supported EN-DC band combinations. Similarly, in step S3B, the base station apparatus 10B transmits a DL signal to the user apparatus 20 on a band on the NR side of the configured band combination from among the UE capabilities of the user apparatus 20, that is, the supported EN-DC band combinations. In step S3C, the user apparatus 20 receives the DL signals transmitted from the base station apparatus 10A and the base station apparatus 10B within the MRTD corresponding to the configured band combination, and executes communication based on the EN-DC.

In step S3A, DL signals based on CA may be transmitted from the base station apparatus 10A, and step S3B need not be executed. In this case, in step S3C, the user apparatus 20 performs, for the DL signals based on the CA from the base station apparatus 10A, a reception operation within the MRTD corresponding to the configured CA band combination.

According to the above-described embodiments, the user apparatus 20 can perform the reception operation based on an accurate MRTD in the band combination defined as that of the inter-band EN-DC or CA.

In other words, a received timing difference can be correctly set for dual connectivity performed in a radio communication system using multiple radio access technologies (RATs).

(Apparatus Configuration)

Next, an example of functional configurations of the base station apparatus 10 and the user apparatus 20 for performing the processes and operations described above is described. The base station apparatus 10 and user apparatus 20 include functions for implementing the embodiments described above. However, each of the base station apparatus 10 and the user apparatus 20 may include only a part of the functions in the embodiments.

<Base Station Apparatus 10>

Figure 4:
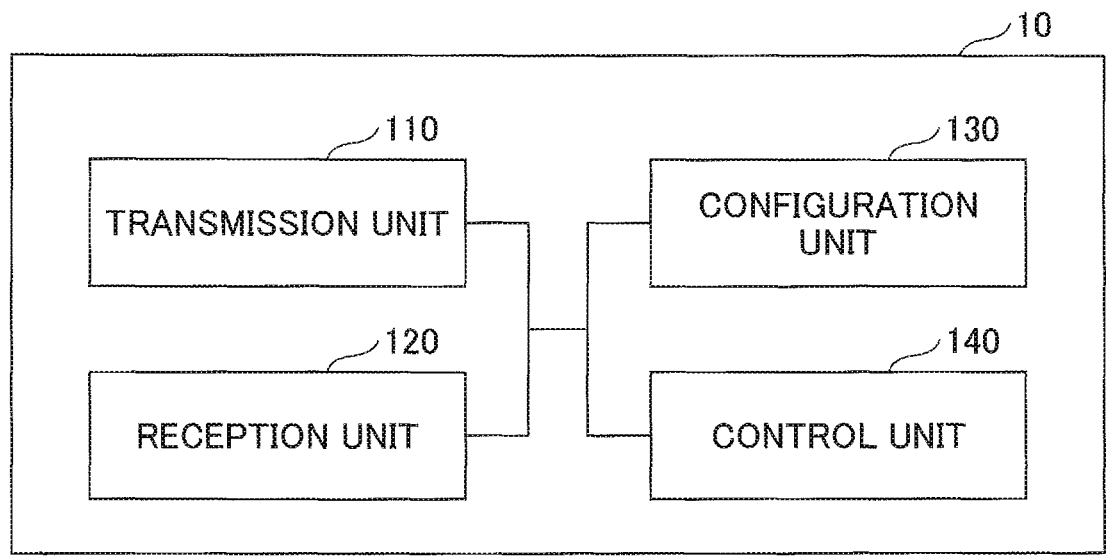
FIG. 4 is a diagram illustrating an example of a functional configuration of a base station apparatus 10 according to an embodiment of the present invention.

FIG. 4 is a diagram illustrating an example of a functional configuration of the base station apparatus 10 according to an embodiment of the present invention. As illustrated in FIG. 4, the base station apparatus 10 includes a transmission unit 110; a reception unit 120; a configuration unit 130; and a control unit 140. The functional configuration shown in FIG. 4 is only one example. If the operation according to the embodiments of the present invention can be executed, the functional division and the name of the functional units may be any division and names.

The transmission unit 110 includes a function for generating a signal to be transmitted to the user apparatus 20 and transmitting the signal through radio. The transmission unit 110 transmits an inter-network node message to another network node. The reception unit 120 includes a function for receiving various signals transmitted from the user apparatus 20 and retrieving, for example, information of a higher layer from the received signals. The transmission unit 110 has a function to transmit NR-PSS, NR-SSS, NR-PBCH, DL/UL control signals, or the like, to the user apparatus 20. The reception unit 120 receives an inter-network node message from another network nodes.

The configuration unit 130 stores preconfigured configuration information and various configuration information to be transmitted to the user apparatus 20. The content of the configuration information is, for example, information related to a transmission setting according to the UE capability of the user apparatus 20.

As described in the embodiments, the control unit 140 performs control related to transmissions to the user apparatus 20, and performs control related to processing of a UE capability report received from the user apparatus 20. A functional unit related to signal transmission in the control unit 140 may be included in the transmission unit 110, and a functional unit related to signal reception in the control unit 140 may be included in the reception unit 120.

<User Apparatus 20>

Figure 5:
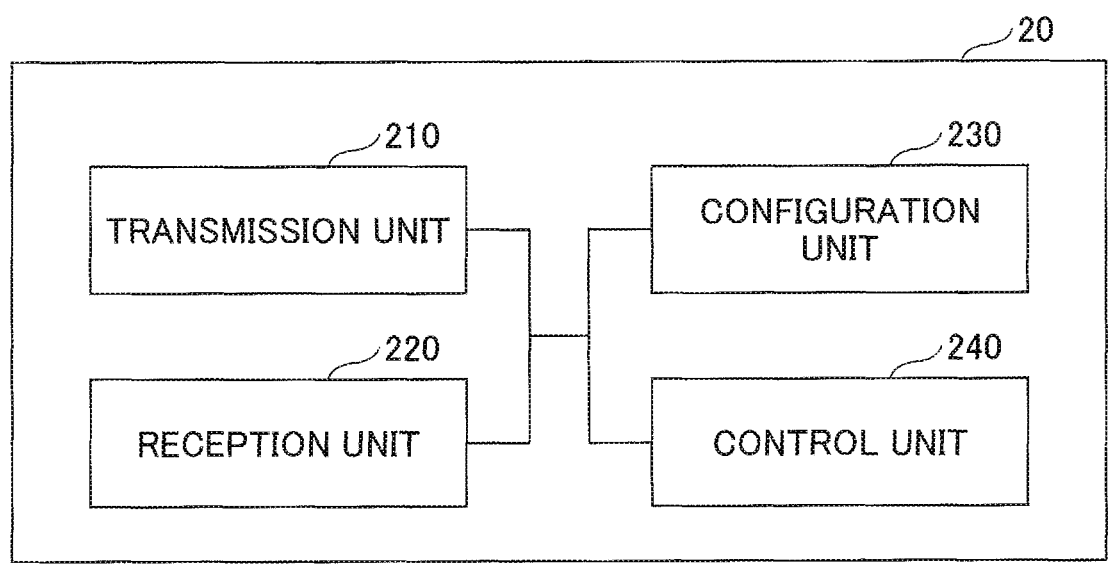
FIG. 5 is a diagram illustrating an example of a functional configuration of a user apparatus 20 according to an embodiment of the present invention.

FIG. 5 is a diagram illustrating an example of a functional configuration of a user apparatus 20 according to an embodiment of the present invention. As illustrated in FIG. 5, the user apparatus 20 includes a transmission unit 210; a reception unit 220; a configuration unit 230; and a control unit 240. The functional configuration shown in FIG. 5 is only one example. If the operation according to the embodiments of the present invention can be performed, the functional division and the name of the functional units may be any division and names.

The transmission unit 210 creates a transmission signal from transmission data and transmits the transmission signal through radio. The reception unit 220 receives various signals through radio and retrieves higher layer signals from the received physical layer signals. The reception unit 220 has a function to receive NR-PSS, NR-SSS, NR-PBCH, DL/UL/SL control signals, or the like, transmitted from the base station apparatus 10. For example, the transmission unit 210 transmits PSCCH (Physical Sidelink Control Channel), PSSCH (Physical Sidelink Shared Channel), PSDCH (Physical Sidelink Discovery Channel), PSBCH (Physical Sidelink Broadcast Channel), or the like, to another user apparatus 20 as D2D communication, and the reception unit 120 receives PSCCH, PSSCH, PSDCH, PSBCH, or the like, from another user apparatus 20.

The configuration unit 230 stores various types of configuration information received from the base station apparatus 10 by the reception unit 220. The configuration unit 230 also stores preconfigured configuration information. The content of the configuration information is, for example, information related to a reception setting according to the UE capability.

The control unit 240 performs control for UE capability reporting of the user apparatus 20 and reception control according to the UE capability as described in the embodiments. A functional unit related to signal transmission in the control unit 240 may be included in the transmission unit 210, and a functional unit related to signal reception in the control unit 240 may be included in the reception unit 220.

(Hardware Configuration)

Block diagrams (FIG. 4 and FIG. 5) used in the description of the above embodiments illustrate blocks of functional units. These functional blocks (components) are implemented by any combination of at least one of hardware and software. In addition, an implementation method of each function block is not particularly limited. That is, each functional block may be implemented using a single device that is physically or logically combined, or may be implemented by directly or indirectly connecting two or more devices that are physically or logically separated (e.g., using wire and/or radio) and using these multiple devices. The functional block may be implemented by combining software with the above-described one device or the above-described plurality of devices Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, and so forth. For example, a functional block (component) that functions to transmit is called a transmitting unit or a transmitter. In either case, as described above, the implementation method is not particularly limited.

Figure 6:
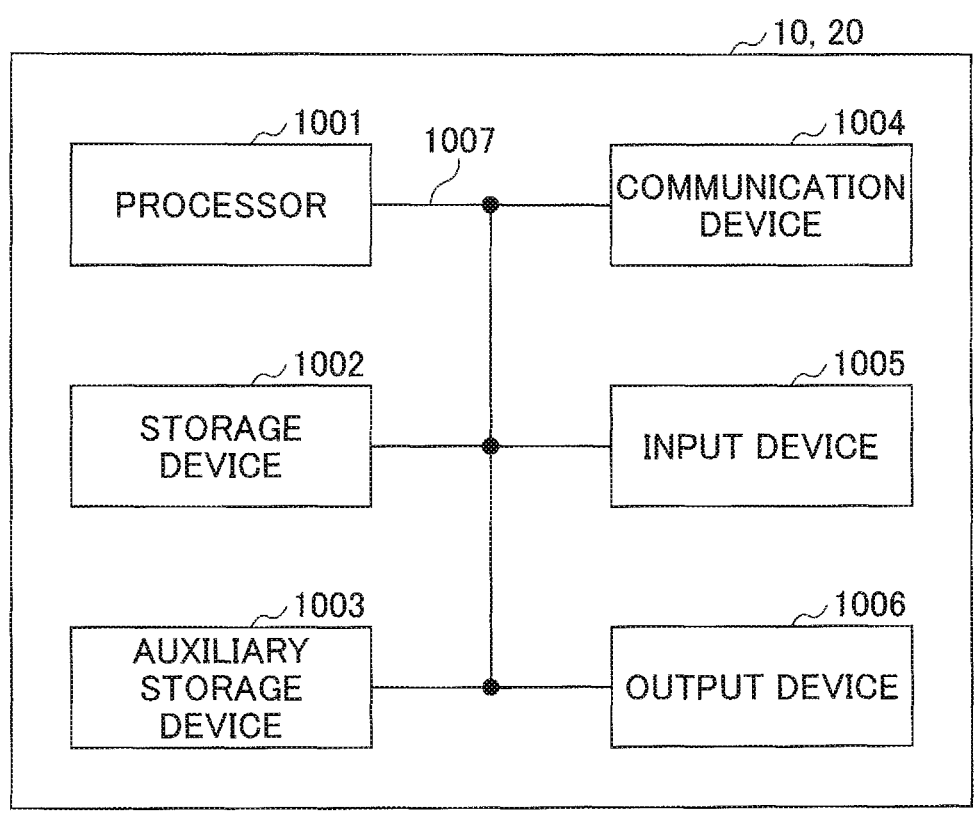
FIG. 6 is a diagram illustrating an example of a hardware configuration of the base station apparatus 10 or the user apparatus 20 according to an embodiment of the present invention.

For example, each of the base station apparatus 10 and the user apparatus 20 according to the embodiments of the present invention may function as a computer that performs processing of the radio communication method according to the present disclosure. FIG. 6 is a diagram illustrating an example of a hardware configuration of the base station apparatus 10 and the user apparatus 20 according to an embodiment of the present disclosure. The base station apparatus 10 and the user apparatus 20 may each be configured as a computer device including, physically, a processor 1001, a storage device 1002, an auxiliary storage device 1003, a communication device 1004, an input device 1005, an output device 1006, a bus 1007, and so forth.

In the following description, the term "device" can be replaced with a circuit, a device, a unit, or the like. The hardware configuration of the base station apparatus 10 and user apparatus 20 may be configured to include one or more of the devices depicted in the figure, or may be configured without some devices.

Each function of the base station apparatus 10 and the user apparatus 20 is implemented by loading predetermined software (program) on hardware, such as the processor 1001 and the storage device 1002, so that the processor 1001 performs computation and controls communication by the communication device 1004, and at least one of reading and writing of data in the storage device 1002 and the auxiliary storage device 1003.

The processor 1001, for example, operates an operating system to control the entire computer. The processor 1001 may be configured with a central processing unit (CPU: Central Processing Unit) including an interface with a peripheral device, a control device, a processing device, a register, and so forth. For example, the above-described control unit 140, control unit 240, or the like may be implemented by the processor 1001.

Additionally, the processor 1001 reads a program (program code), a software module, data, or the like, from at least one of the auxiliary storage device 1003 and the communication device 1004 to the storage device 1002, and executes various processes according to these. As the program, a program is used which causes a computer to execute at least a part of the operations described in the above-described embodiments. For example, the control unit 140 of the base station apparatus 10 illustrated in FIG. 4 may be implemented by a control program that is stored in the storage device 1002 and that is operated by the processor 1001. Furthermore, for example, the control unit 240 of the user apparatus 20 illustrated in FIG. 5 may be implemented by a control program that is stored in the storage device 1002 and that is operated by the processor 1001. While the various processes described above are described as being executed in one processor 1001, they may be executed simultaneously or sequentially by two or more processors 1001. The processor 1001 may be implemented by one or more chips. The program may be transmitted from a network via a telecommunications line.

The storage device 1002 is a computer readable storage medium, and, for example, the storage device 1002 may be formed of at least one of a Read Only Memory (ROM), an Erasable Programmable ROM (EPROM), an Electrically Erasable Programmable ROM (EEPROM), a Random Access Memory (RAM), and so forth. The storage device 1002 may be referred to as a register, a cache, a main memory (main storage device), or the like. The storage device 1002 may store a program (program code), a software module, or the like, which can be executed for implementing the communication method according to one embodiment of the present disclosure.

The auxiliary storage device 1003 is a computer readable storage medium and may be formed of, for example, at least one of an optical disk, such as a CD-ROM (Compact Disc ROM), a hard disk drive, a flexible disk, an optical magnetic disk (e.g., a compact disk, a digital versatile disk, a Blu-ray (registered trademark) disk, a smart card, a flash memory (e.g., a card, a stick, a key drive), a floppy (registered trademark) disk, and a magnetic strip. The above-described storage medium may be, for example, a database including at least one of the storage device 1002 and the auxiliary storage device 1003, a server, or any other suitable medium.

The communication device 1004 is hardware (transmitting and receiving device) for performing communication between computers through at least one of a wired network and a wireless network, and is also referred to, for example, as a network device, a network controller, a network card, or a communication module. The communication device 1004 may be configured to include, for example, a high frequency switch, a duplexer, a filter, a frequency synthesizer, and the like to implement at least one of frequency division duplex (FDD: Frequency Division Duplex) and time division duplex (TDD: Time Division Duplex). For example, a transmitting/receiving antenna, an amplifier unit, a transceiver unit, a transmission line interface, and the like may be implemented by the communication device 1004. The transceiver unit may be implemented so that the transmitting unit and the receiving unit are physically or logically separated.

The input device 1005 is an input device (e.g., a keyboard, a mouse, a microphone, a switch, a button, or a sensor) that receives an external input. The output device 1006 is an output device (e.g., a display, speaker, or LED lamp) that performs output toward outside. The input device 1005 and the output device 1006 may be configured to be integrated (e.g., a touch panel).

Each device, such as the processor 1001 and the storage device 1002, is also connected by the bus 1007 for communicating information. The bus 1007 may be formed of a single bus or may be formed of different buses between devices.

The base station apparatus 10 and the user apparatus 20 may each include hardware, such as a microprocessor, a digital signal processor (DSP: Digital Signal Processor), an Application Specific Integrated Circuit (ASIC), a Programmable Logic Device (PLD), and a Field Programmable Gate Array (FPGA), which may implement some or all of each functional block. For example, processor 1001 may be implemented using at least one of these hardware components.

Conclusion of the Embodiments

As described above, according to the embodiments of the present invention, there is provided a user apparatus including a reception unit that receives, from a base station apparatus, information requesting a capability report of the user apparatus; a transmission unit that transmits, to the base station apparatus, the capability report of the user apparatus; and a control unit that receives a first signal transmitted from the base station apparatus, and a second signal transmitted from another base station apparatus or a third signal transmitted from the base station apparatus, within a maximum receive timing difference associated with a band combination included in the capability report of the user apparatus, wherein the band combination includes a combination of a band of the first signal, and a band of the second signal or a band of the third signal, and wherein a radio access technology for the first signal differs from a radio access technology for the second signal, and the radio access technology for the first signal is same as a radio access technology for the third signal.

With the above-described configuration, the user apparatus 20 can perform the reception operation based on an accurate MRTD in the band combination defined as the inter-band EN-DC or CA. In other words, a received timing difference can be correctly set for dual connectivity performed in a radio communication system using multiple radio access technologies (RATS).

A received timing difference that is to be applied to the same bands may be associated with the band combination of the band of the first signal, and the band of the second signal or the band of the third signal, as the maximum receive timing difference. With this configuration, the user apparatus 20 can use the MRTD to be applied to the intra-band for an EN-DC band combination or a CA band combination.

The maximum receive timing difference associated with the band combination may be determined based on information indicating whether the base station apparatus and the another base station apparatus are located at a same location. According to this configuration, the user apparatus 20 can determine the MRTD based on the base station location information.

As described above, according to the embodiments of the present invention, there is provided a base station apparatus including a transmission unit that transmits, to a user apparatus, information requesting a capability report of the user apparatus; a reception unit that receives, from the user apparatus, the capability report of the user apparatus; and a control unit that transmits a first signal transmitted from a first base station apparatus, and a second signal transmitted from a second base station apparatus or a third signal transmitted from the first base station apparatus, within a maximum receive timing difference associated with a band combination included in the capability report of the user apparatus, the base station apparatus being the first base station apparatus, wherein the band combination includes a combination of a band of the first signal, and a band of the second signal or a band of the third signal, and wherein a radio access technology for the first signal differs from a radio access technology for the second signal, and the radio access technology for the first signal is same as a radio access technology for the third signal.

With the above-described configuration, the user apparatus 20 can perform the reception operation based on an accurate MRTD in the band combination defined as the inter-band EN-DC or CA. In other words, a received timing difference can be correctly set for dual connectivity performed in a radio communication system using multiple radio access technologies (RATS).

Supplemental Embodiments

While the embodiments of the present invention are described above, the disclosed invention is not limited to the embodiments, and those skilled in the art will appreciate various alterations, modifications, alternatives, substitutions, and so forth. Descriptions are provided using specific numerical examples to facilitate understanding of the invention, but, unless as otherwise specified, these values are merely examples and any suitable value may be used. Classification of the items in the above descriptions is not essential to the present invention, and the items described in two or more items may be used in combination as needed, or the items described in one item may be applied to the items described in another item (as long as there is no contradiction). The boundaries of functional units or processing units in the functional block diagram do not necessarily correspond to the boundaries of physical components. An operation by a plurality of functional units may be physically performed by one component or an operation by one functional unit may be physically executed by a plurality of components. For the processing procedures described in the embodiment, the order of processing may be changed as long as there is no contradiction. For the convenience of the description of the process, the base station apparatus 10 and the user apparatus 20 are described using functional block diagrams, but such devices may be implemented in hardware, software, or a combination thereof. Software operated by a processor included in the base station apparatus 10 in accordance with embodiments of the present invention and software operated by a processor included in the user apparatus 20 in accordance with embodiments of the present invention may be stored in a random access memory (RAM), a flash memory (RAM), a read-only memory (ROM), an EPROM, an EEPROM, a register, a hard disk (HDD), a removable disk, a CD-ROM, a database, a server, or any other suitable storage medium, respectively.

Notification of information is not limited to the aspects/embodiments described in the disclosure, and notification of information may be made by another method. For example, notification of information may be implemented by physical layer signaling (e.g., Downlink Control Information (DCI), Uplink Control Information (UCI), higher layer signaling (e.g., Radio Resource Control (RRC) signaling, Medium Access Control (MAC) signaling, broadcast information (Master Information Block (MIB), System Information Block (SIB))), or other signals or combinations thereof. RRC signaling may be referred to as an RRC message, for example, which may be an RRC connection setup message, an RRC connection reconfiguration message, or the like.

The aspects/embodiments described in this disclosure may be applied to a system using at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), any other appropriate system, and a next generation system extended based on theses. Additionally, a plurality of systems may be combined (e.g., a combination of at least one of LTE and LTE-A and 5G) to be applied.

The processing procedures, sequences, flow charts, and the like of each aspect/embodiment described in this disclosure may be reordered, provided that there is no contradiction. For example, the methods described in this disclosure present elements of various steps in an exemplary order and are not limited to the particular order presented.

The particular operation described in this specification to be performed by base station apparatus 10 may be performed by an upper node in some cases. It is apparent that in a network consisting of one or more network nodes having base station apparatus 10, various operations performed for communicating with the user apparatus 20 may be performed by at least one of the base station apparatus 10 and network nodes other than the base station apparatus 10 (e.g., MME or S-GW can be considered, however, the network node is not limited to these). The case is exemplified above in which there is one network node other than the base station apparatus 10. However, the network node other than the base station apparatus 10 may be a combination of multiple other network nodes (e.g., MME and S-GW).

The information or signals described in this disclosure can be output from a higher layer (or lower layer) to a lower layer (or higher layer). It may be input and output through multiple network nodes.

Input and output information may be stored in a specific location (e.g., memory) or managed using management tables. Input and output information may be overwritten, updated, or added. Output information may be deleted. The input information may be transmitted to another device.

The determination in the disclosure may be made by a value (0 or 1) represented by 1 bit, by a true or false value (Boolean: true or false), or by comparison of numerical values (e.g., a comparison with a predefined value).

Software should be broadly interpreted to mean, regardless of whether referred to as software, firmware, middleware, microcode, hardware description language, or any other name, instructions, sets of instructions, code, code segments, program code, programs, subprograms, software modules, applications, software applications, software packages, routines, subroutines, objects, executable files, executable threads, procedures, functions, and so forth.

Software, instructions, information, or the like, may also be transmitted and received via a transmission medium. For example, when software is transmitted from a website, server, or other remote source using at least one of wireline technology (such as coaxial cable, fiber optic cable, twisted pair, digital subscriber line) and wireless technology (e.g., infrared or microwave), at least one of these wireline technology and wireless technology is included within the definition of a transmission medium.

The information, signals, or the like, described in this disclosure may be represented using any of a variety of different techniques. For example, data, instructions, commands, information, signals, bits, symbols, chips, or the like, which may be referred to throughout the above description may be represented by voltages, currents, electromagnetic waves, magnetic fields or magnetic particles, optical fields or photons, or any combination thereof.

The terms described in this disclosure and those necessary for understanding this disclosure may be replaced by terms having the same or similar meanings. For example, at least one of the channels and the symbols may be a signal (signaling). The signal may also be a message. The component carrier may also be referred to as a carrier frequency, cell, frequency carrier, and so forth.

As used in this disclosure, the terms "system" and "network" are used interchangeably.

The information, parameters, or the like described in the present disclosure may also be expressed using absolute values, relative values from predetermined values, or they may be expressed using corresponding separate information. For example, radio resources may be those indicated by an index.

The name used for the parameters described above are not restrictive in any respect. In addition, the mathematical equations using these parameters may differ from those explicitly disclosed in this disclosure. Since the various channels (e.g., PUCCH and PDCCH) and information elements can be identified by any suitable name, the various names assigned to these various channels and information elements are not in any way limiting.

In this disclosure, the terms "Base Station," "Radio Base Station," "Fixed Station," "NodeB," "eNodeB(eNB)," "gNodeB (gNB)," "Access Point," "Transmission Point," "Reception Point," "Transmission/Reception Point," "Cell," "Sector," "Cell Group," "Carrier," "Component Carrier," and so forth, may be used interchangeably. The base stations may be referred to in terms such as macro-cell, small-cell, femto-cell, or pico-cell.

The base station can accommodate one or more (e.g., three) cells. Where the base station accommodates a plurality of cells, the entire coverage area of the base station can be divided into a plurality of smaller areas, each smaller area can also provide communication services by means of a base station subsystem (e.g., an indoor small base station (RRH) or a remote Radio Head). The term "cell" or "sector" refers to a portion or all of the coverage area of at least one of the base station and base station subsystem that provides communication services at the coverage.

In this disclosure, terms such as "mobile station (MS: Mobile Station)", "user terminal", "user equipment (UE: User Equipment)", or "terminal", may be used interchangeably.

The mobile station may be referred to by one of ordinary skill in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

At least one of a base station and a mobile station may be referred to as a transmitter, receiver, communication device, or the like. At least one of a base station and a mobile station may be a device installed in a mobile body, a mobile body itself, or the like. The mobile body may be a vehicle (e.g., a car or an airplane), an unmanned mobile (e.g., a drone or an automated vehicle), or a robot (manned or unmanned). At least one of a base station and a mobile station includes a device that does not necessarily move during communication operations. For example, at least one of a base station and a mobile station may be an Internet of Things (IoT) device such as a sensor.

In addition, the base station in the present disclosure may be replaced with the user terminal. For example, various aspects/embodiments of the present disclosure may be applied to a configuration in which communication between the base stations and the user terminal is replaced with communication between multiple user apparatuses 20 (e.g., may be referred to as Device-to-Device (D2D), or Vehicle-to-Everything (V2X)). In this case, a configuration may be such that the above-described function of the base station apparatus 10 is included in the user apparatus 20. The terms "up" and "down" may also be replaced with the terms corresponding to the inter-terminal communication (e.g., "side"). For example, an uplink channel, a downlink channel, or the like may be replaced with a sidelink channel.

Similarly, the user terminal in the present disclosure may be replaced with the base station. In this case, a configuration may be such that the above-described function of the user terminal may be included in the base station.

The terms "determine (determining)" and "decide (determining)" used in this disclosure may include various types of operations. For example, "determining" and "deciding" may include deeming that a result of judging, calculating, computing, processing, deriving, investigating, looking up (search, inquiry) (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided. "Determine (decision)" may be replaced with "assuming," "expecting" "considering," and so forth.

The term "connected" or "coupled" or any variation thereof means any direct or indirect connection or connection between two or more elements and may include the presence of one or more intermediate elements between two elements "connected" or "coupled" with each other. The coupling or connection between the elements may be physical, logical, or a combination of these. For example, "connection" may be replaced with "access". As used in the present disclosure, the two elements may be considered as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS or may be referred to as a pilot, depending on the standards applied.

As used in this disclosure, the expression "based on" does not mean "based on only" unless otherwise specified. In other words, the expression "based on" means both "based on only" and "at least based on."

Any reference to elements using names, such as "first" and "second," as used in this disclosure does not generally limit the amount or order of those elements. These names can be used in this specification as a convenient way to distinguish between two or more elements. Accordingly, the reference to the first and second elements does not imply that only two elements can be adopted, or that the first element must precede the second element in some way.

The "means" in the configuration of each of the above-described devices may be replaced with "part," "circuit," "device," and so forth.

As long as "include," "including," and variations thereof are used in this disclosure, the terms are intended to be inclusive in a manner similar to the term "comprising." Furthermore, the term "or" used in the disclosure is intended not to be an exclusive OR.

A radio frame may be formed of one or more frames in the time domain. In the time domain, each of the one or more frames may be referred to as a subframe. A subframe may further be formed of one or more slots in the time domain. A subframe may be a fixed time length (e.g., 1 ms) that does not depend on numerology.

The numerology may be a communication parameter to be applied to at least one of transmission or reception of a signal or a channel. The numerology may represent, for example, at least one of a subcarrier spacing (SCS: SubCarrier Spacing), a bandwidth, a symbol length, a cyclic prefix length, a transmission time interval (TTI: Transmission Time Interval), a symbol number per TTI, a radio frame configuration, a specific filtering process performed by a transceiver in a frequency domain, a specific windowing process performed by a transceiver in a time domain, and the like.

A slot may be formed of, in a time domain, one or more symbols (Orthogonal Frequency Division Multiplexing (OFDM) symbols, Single Carrier Frequency Division Multiple Access (SC-FDMA) symbols, or the like). A slot may be a unit of time based on the numerology.

A slot may include a plurality of mini-slots. In a time domain, each mini-slot may be formed of one or more symbols. A mini-slot may also be referred to as a sub-slot. A mini-slot may be formed of fewer symbols than those of a slot. The PDSCH (or PUSCH) transmitted in a unit of time that is greater than a mini-slot may be referred to as PDSCH (or PUSCH) mapping type A. The PDSCH (or PUSCH) transmitted using a mini-slot may be referred to as PDSCH (or PUSCH) mapping type B.

Each of the radio frame, subframe, slot, mini-slot, and symbol represents a time unit for transmitting a signal. The radio frame, subframe, slot, mini-slot, and symbol may be called by respective different names.

For example, one subframe may be referred to as a transmission time interval (TTI: Transmission Time Interval), a plurality of consecutive subframes may be referred to as TTI, or one slot or one mini-slot may be referred to as TTI. Namely, at least one of a subframe and TTI may be a subframe (1 ms) in the existing LTE, may be a time interval shorter than 1 ms (e.g., 1 to 13 symbols), or a time interval longer than 1 ms. Note that the unit representing the TTI may be referred to as a slot, a mini-slot, or the like, instead of a subframe.

Here, the TTI refers to, for example, the minimum time unit of scheduling in radio communication. For example, in the LTE system, the base station performs scheduling for assigning radio resources (such as a frequency bandwidth and transmission power, that can be used in each user apparatus 20) in units of TTIs to each user apparatus 20. Note that the definition of the TTI is not limited to this.

The TTI may be a transmission time unit, such as a channel coded data packet (transport block), a code block, or a codeword, or may be a processing unit for scheduling, link adaptation, or the like. Note that, when a TTI is provided, a time interval (e.g., a symbol number) onto which a transport block, a code block, or a code ward is actually mapped may be shorter than the TTI.

Note that, when one slot or one mini-slot is referred to as a TTI, one or more TTIs (i.e., one or more slots or one or more mini-slots) may be the minimum time unit of scheduling. Additionally, the number of slots (the number of mini-slots) forming the minimum time unit of scheduling may be controlled.

A TTI with a time length of 1 ms may be referred to as an ordinary TTI (TTI in LTE Rel. 8-12), a normal TTI, a long TTI, an ordinary subframe, a normal subframe, a long subframe, a slot, and so forth. A TTI that is shorter than a normal TTI may be referred to as a shortened TTI, a short TTI, a partial TTI (partial TTI or fractional TTI), a shortened subframe, a short subframe, a mini-slot, a sub-slot, a slot, and so forth.

Note that a long TTI (e.g., a normal TTI, a subframe) may be replaced with a TTI with a time length exceeding 1 ms, and a short TTI (e.g., a shortened TTI) may be replaced with a TTI with a TTI length that is shorter than the TTI length of the long TTI and longer than or equal to 1 ms.

A resource block (RB) is a resource allocation unit in the time domain and the frequency domain, and may include one or more consecutive subcarriers in the frequency domain. A number of subcarriers included in a RB may be the same irrespective of numerology, and may be 12, for example. The number of subcarriers included in a RB may be determined based on numerology.

Additionally, the resource block may include one or more symbols in the time domain, and may have a length of one slot, one mini-slot, one subframe, or one TTI. Each of one TTI and one subframe may be formed of one or more resource blocks.

Note that one or more RBs may be referred to as a physical resource block (PRB: Physical RB), a subcarrier group (SCG: Sub-Carrier Group), a resource element group (REG: Resource Element Group), a PRB pair, a RB pair, or the like.

Additionally, a resource block may be formed of one or more resource elements (RE: Resource Element). For example, 1 RE may be a radio resource area of 1 subcarrier and 1 symbol.

A bandwidth part (BWP: Bandwidth Part) (which may also be referred to as a partial bandwidth) may represent, in a certain carrier, a subset of consecutive common RB (common resource blocks) for a certain numerology. Here, the common RB may be specified by an index of a RB when a common reference point of the carrier is used as a reference. A PRB may be defined in a BWP, and may be numbered in the BWP.

The BWP may include a BWP for UL (UL BWP) and a BWP for DL (DL BWP). For a UE, one or more BWPs may be configured within one carrier.

At least one of the configured BWPs may be active, and the UE may not assume that a predetermined signal/channel is communicated outside the active BWP. Note that "cell," "carrier," or the like in the present disclosure may be replaced with "BWP."

The structures of the above-described radio frame, subframe, slot, mini-slot, symbol, and the like are merely illustrative. For example, the following configurations can be variously changed: the number of subframes included in the radio frame; the number of slots per subframe or radio frame; the number of mini-slots included in the slot; the number of symbols and RBs included in the slot or mini-slot; the number of subcarriers included in the RB; the number of symbols, the symbol length, the cyclic prefix (CP: Cyclic Prefix) length, and the like within the TTI.

In the present disclosure, for example, if an article is added by translation, such as a, an, and the in English, the present disclosure may include that the noun following the article is plural.

In the present disclosure, the term "A and B are different" may imply that "A and B are different from each other." Note that the term may also imply "each of A and B is different from C." The terms, such as "separated" or "coupled," may also be interpreted similarly.

The aspects/embodiments described in this disclosure may be used alone, in combination, or switched with implementation. Notification of predetermined information (e.g. "X" notice) is not limited to a method that is explicitly performed, and may also be made implicitly (e.g. "no notice of the predetermined information").

Note that, in the present disclosure, the RAT is an example of a radio access technology.

While the present disclosure is described in detail above, those skilled in the art will appreciate that the present disclosure is not limited to the embodiments described in the present disclosure. The disclosure may be implemented as modifications and variations without departing from the gist and scope of the disclosure as defined by the claims. Accordingly, the description of the present disclosure is for illustrative purposes only and is not intended to have any restrictive meaning with respect to the present disclosure.

LIST OF REFERENCE SYMBOLS 10 base station apparatus
110 transmission unit
120 reception unit
130 configuration unit
140 control unit
20 user apparatus
210 transmission unit
220 reception unit 230 configuration unit
240 control unit
1001 processor
1002 storage device
1003 auxiliary storage device
1004 communication device
1005 input device
1006 output device

The invention claimed is:

1. A terminal comprising:
a reception unit that receives, from a base station apparatus, a message requesting a report of capability of the terminal;
a transmission unit that transmits, to the base station apparatus, a message reporting the capability of the terminal; and
a control unit that receives a first signal transmitted from the base station apparatus and a second signal transmitted from another base station apparatus, within a maximum receive timing difference applied to a band combination included in the message reporting the capability of the terminal,
wherein the band combination includes a combination of a band of the first signal and a band of the second signal, and a radio access technology for the first signal differs from a radio access technology for the second signal, and
wherein a receive timing difference that is to be applied to the same bands is applied to the combination of the band of the first signal and the band of the second signal, as the maximum receive timing difference.

2. The terminal of claim 1, wherein the maximum receive timing difference applied to the band combination is determined based on information indicating whether the base station apparatus and the another base station apparatus are located at a same location.

3. A base station apparatus that is a first base station apparatus comprising:
a transmission unit that transmits, to a terminal, a message requesting a report of capability of the terminal;
a reception unit that receives, from the terminal, a message reporting the capability of the terminal; and
a control unit that transmits a first signal transmitted from the first base station apparatus and a second signal transmitted from a second base station apparatus, within a maximum receive timing difference applied to a band combination included in the message reporting the capability of the terminal,
wherein the band combination includes a combination of a band of the first signal and a band of the second signal, and a radio access technology for the first signal differs from a radio access technology for the second signal, and
wherein a receive timing difference that is to be applied to the same bands is applied to the combination of the band of the first signal and the band of the second signal, as the maximum receive timing difference.

4. A communication method by a terminal, the method comprising:
receiving, from a base station apparatus, a message requesting a report of capability of the terminal;
transmitting, to the base station apparatus, a message reporting the capability of the terminal; and
receiving a first signal transmitted from the base station apparatus and a second signal transmitted from another base station apparatus, within a maximum receive timing difference applied to a band combination included in the message reporting the capability of the terminal,
wherein the band combination includes a combination of a band of the first signal and a band of the second signal, and a radio access technology for the first signal differs from a radio access technology for the second signal, and
wherein a receive timing difference that is to be applied to the same bands is applied to the combination of the band of the first signal and the band of the second signal, as the maximum receive timing difference.

5. A radio communication system comprising:
a terminal;
a first base station apparatus; and
a second base station apparatus,
wherein the terminal includes:
a reception unit that receives, from a base station apparatus, a message requesting a report of capability of the terminal;
a transmission unit that transmits, to the base station apparatus, a message reporting the capability of the terminal; and
a control unit that receives a first signal transmitted from the base station apparatus and a second signal transmitted from another base station apparatus, within a maximum receive timing difference applied to a band combination included in the message reporting the capability of the terminal,
wherein the band combination includes a combination of a band of the first signal and a band of the second signal, and a radio access technology for the first signal differs from a radio access technology for the second signal, and
wherein a receive timing difference that is to be applied to the same bands is applied to the combination of the band of the first signal and the band of the second signal, as the maximum receive timing difference.

* * * * *